United States Patent
Sasaki et al.

(10) Patent No.: US 9,502,946 B2
(45) Date of Patent: Nov. 22, 2016

(54) INVERTER MODULE HAVING TRAPEZOIDAL SHAPE FOR CONVERSION OF DC POWER TO AC POWER

(71) Applicant: NISSAN MOTOR CO., LTD., Yokohama-shi, Kanagawa (JP)

(72) Inventors: Kensuke Sasaki, Madison, WI (US); Hiroyuki Nakayama, Yokohama (JP); Yukio Mizukoshi, Machida (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/382,466

(22) PCT Filed: Feb. 20, 2013

(86) PCT No.: PCT/JP2013/054091
§ 371 (c)(1),
(2) Date: Sep. 2, 2014

(87) PCT Pub. No.: WO2013/133014
PCT Pub. Date: Sep. 12, 2013

(65) Prior Publication Data
US 2015/0097470 A1    Apr. 9, 2015

(30) Foreign Application Priority Data

Mar. 8, 2012    (JP) ................................. 2012-051928

(51) Int. Cl.
*H02K 11/00* (2016.01)
*H02M 7/00* (2006.01)
(Continued)

(52) U.S. Cl.
CPC .......... *H02K 11/0073* (2013.01); *H02K 11/33* (2016.01); *H02M 7/003* (2013.01); *H02K 3/522* (2013.01); *H02K 11/001* (2013.01); *H02K 11/0068* (2013.01); *H02M 7/48* (2013.01)

(58) Field of Classification Search
CPC .............. H02K 11/00; H02K 11/001; H02K 11/0068; H02K 11/0073; H02K 3/522; H02M 7/48

USPC ............................. 310/68 D; 361/730, 735
See application file for complete search history.

(56) References Cited

U.S. PATENT DOCUMENTS 8,339,079 B2 * 12/2012 Yamada ................ H01L 25/072 257/618
2003/0047304 A1 * 3/2003 Kasuga ................. H01L 25/11 165/185

(Continued)

FOREIGN PATENT DOCUMENTS

JP    2007-116840 A    5/2007
JP    2008-099460 A    4/2008

(Continued)

OTHER PUBLICATIONS

Sasaki et al., English Translation of JP 2008-099460.*

*Primary Examiner* — Terrance Kenerly
*Assistant Examiner* — Rashad Johnson
(74) *Attorney, Agent, or Firm* — Foley & Lardner LLP

(57) ABSTRACT

Provided is an inverter module for use in an inverter-integrated motor, the inverter module being arranged at an axial end portion of a motor, the inverter module including trapezoidal power modules, each of which has a single-phase inverter circuit mounted thereon, and includes an electrical connection terminal for a power supply arranged on a short side thereof and an electrical connection terminal for the motor arranged on a long side thereof. A plurality of the trapezoidal power modules are arranged in an annular pattern so that the long side of the each of the plurality of the trapezoidal power modules faces toward an outer periphery, to thereby construct a polyphase inverter circuit.

7 Claims, 5 Drawing Sheets

(51) Int. Cl.
*H02M 7/48* (2007.01)
*H02K 3/52* (2006.01)

(56) References Cited

U.S. PATENT DOCUMENTS

| | | | |
|---|---|---|---|
| 2004/0189114 A1* | 9/2004 | Iwashima | H02K 11/33 310/68 D |
| 2006/0220213 A1* | 10/2006 | Kondou et al. | 257/690 |
| 2010/0117466 A1* | 5/2010 | Gas | H02K 11/048 310/62 |
| 2010/0327678 A1 | 12/2010 | Yamasaki et al. | |
| 2010/0328901 A1* | 12/2010 | Minato | H01L 21/561 361/730 |
| 2011/0050138 A1* | 3/2011 | Li | H02K 3/28 318/400.27 |
| 2011/0148337 A1* | 6/2011 | Yamada | 318/400.26 |
| 2011/0254393 A1* | 10/2011 | Yamasaki | H02K 11/33 310/64 |
| 2013/0155745 A1* | 6/2013 | Tanaka | H02M 7/003 363/131 |
| 2014/0084722 A1* | 3/2014 | Minato | H01L 21/561 310/64 |
| 2014/0151146 A1* | 6/2014 | Tanaka | B62D 5/0406 180/443 |
| 2015/0029672 A1* | 1/2015 | Nakayama et al. | 361/715 |

FOREIGN PATENT DOCUMENTS

| | | |
|---|---|---|
| JP | 2011-010409 A | 1/2011 |
| JP | 2011-030348 A | 2/2011 |
| JP | 2012-029516 A | 2/2012 |

* cited by examiner

INVERTER MODULE HAVING TRAPEZOIDAL SHAPE FOR CONVERSION OF DC POWER TO AC POWER

TECHNICAL FIELD

This invention relates to an inverter module that is integrated with a motor.

BACKGROUND ART

In JP 2007-116840 A, there is disclosed an inverter-integrated motor in which a polyphase inverter module, which converts electric power of a DC power supply into AC power to supply the AC power to an AC motor, is mounted on a casing of the AC motor. This configuration reduces the size and weight of an apparatus including the motor and the inverter and reduces wiring loss.

SUMMARY OF INVENTION

In JP 2007-116840 A, however, an electrical connection between the motor and the inverter module is established in the vicinity of the motor shaft center, and hence a lead wire is routed from a stator provided on an outer peripheral side of the motor to the vicinity of the motor shaft center, which needs a space for wire routing. Further, an electrical connection between a power supply and the inverter module is also established in the vicinity of the motor shaft center, and hence connection portions are concentrated on the vicinity of the motor shaft center, which needs another space for the connection work. As described above, it is necessary to provide the space for the wire routing and the space for the connection work, and hence upsizing of an inverter module portion is unavoidable.

It is therefore an object of this invention to provide an inverter module for use in an inverter-integrated motor, which has a small space necessary for the wire routing and the connection work as described above.

An inverter module according to one embodiment of this invention is an inverter module for use in an inverter-integrated motor, and includes a plurality of power modules each having a single-phase inverter circuit mounted thereon. The power module has a trapezoidal shape, and includes an electrical connection terminal for a power supply arranged on a short side thereof and an electrical connection terminal for the motor arranged on a long side thereof. The plurality of power modules are arranged in an annular pattern so that the long side of each of the plurality of power modules faces toward an outer periphery, to thereby construct a polyphase inverter circuit. In other words, the electrical connection terminals for the motor are arranged on an outer peripheral side of a polyphase module.

DESCRIPTION OF EMBODIMENT

An embodiment of this invention is described below with reference to the drawings.

Figure 1A:
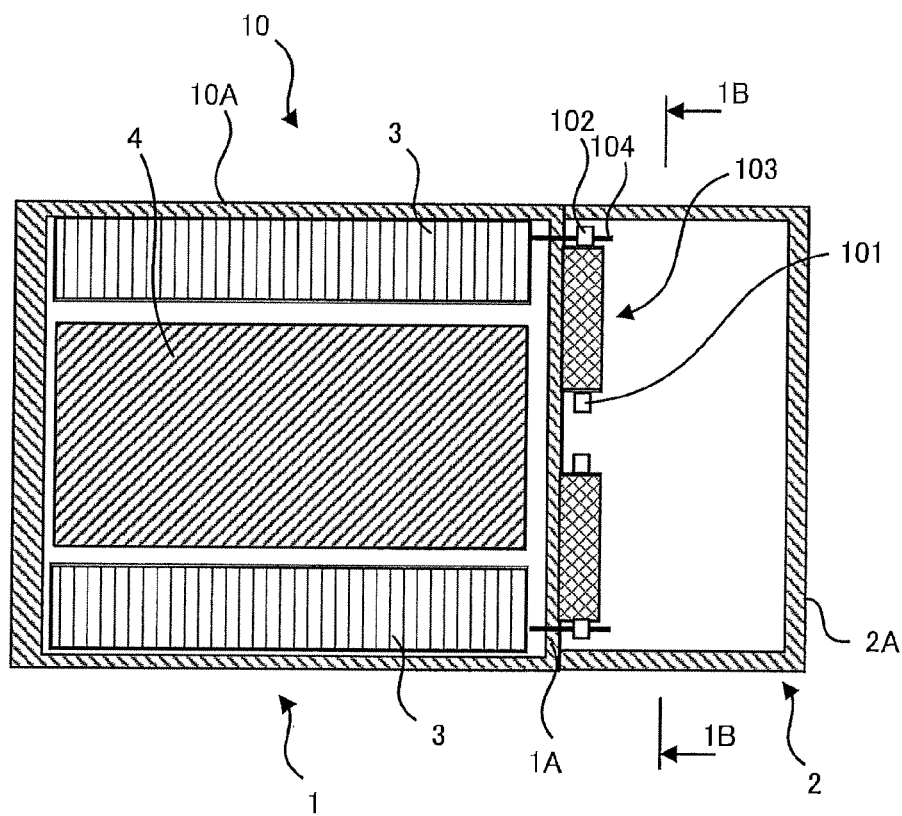
FIG. 1A is a horizontal sectional view of an inverter-integrated motor according to an embodiment of this invention.
Figure 1B:
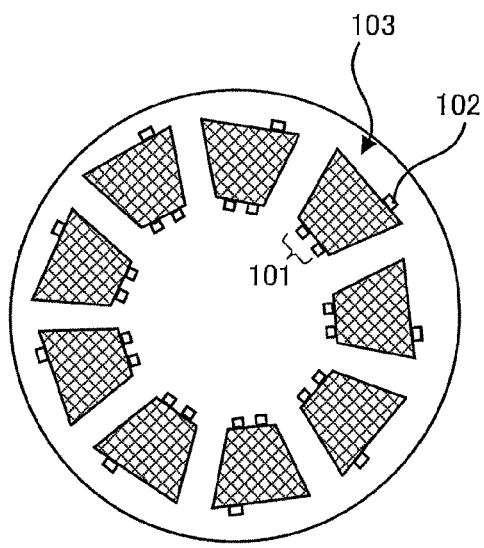
FIG. 1B is a sectional view taken along the line 1B-1B of FIG. 1A.

FIG. 1A is a schematic configuration diagram of an inverter-integrated motor according to this embodiment, and is a sectional view taken along a rotary shaft of an electric motor 1. FIG. 1B is a sectional view taken along the line 1B-1B of FIG. 1A.

In an inverter-integrated motor 10, an inverter module 2 constructing a polyphase inverter circuit is mounted on a motor wall 1A that is provided at an end portion of the motor in the rotary shaft direction, which is a part of a motor casing 10A. It should be noted that the inverter-integrated motor 10 is, for example, an AC motor for use as a drive motor for an electric vehicle, and is driven by electric power supplied from a DC power supply, such as an on-board battery, via the inverter module 2.

The motor 1 includes a rotor 4 and a stator 3. The rotor 4 rotates about the rotary shaft (not shown). The stator 3 is arranged so as to surround an outer periphery of the rotor 4.

The inverter module 2 is formed by arranging a plurality of power modules 103, each of which has a single-phase inverter circuit mounted thereon, in an annular pattern as described below.

As illustrated in FIG. 1B, the power module 103 has a trapezoidal cross-section, and includes power supply connection terminals 101 on its short side, which serve as electrical connection terminals for a power supply (not shown), and a motor connection terminal 102 on its long side, which serves as an electrical connection terminal for the motor 1. Then, the power modules 103 are arranged on the motor wall 1A on the inverter side in an annular pattern so that the short sides face toward the shaft center. Accordingly, the motor connection terminals 102 are arranged on an outer peripheral portion of the inverter module 2 in an annular pattern.

Wiring 104 for electrically connecting the motor 1 and the inverter module 2 to each other is extracted from the stator 3 so as to pass through the motor wall 1A to be routed linearly to the motor connection terminal 102. In FIG. 1A and FIG. 1B, the position of the motor connection terminal 102 and the position of a through hole of the motor wall 1A for extracting the wiring 104 are aligned with each other to minimize the length of the wiring 104.

As described above, the motor connection terminals 102 are arranged at the outer periphery of the inverter module 2 in an annular pattern, and hence the wiring 104 does not need to be bent unnecessarily but can electrically connect the motor 1 and the inverter module 2 to each other with a shorter length. Further, the electrical connection to the motor 1 is established on the outer peripheral side and the electrical connection to the power supply is established on the inner peripheral side, and hence the respective connection works are performed at different locations, and the work space can be reduced as compared to the case where both connection works are performed at a single location. In other words, the space for the routing of the wiring 104 and the space for the connection work can be reduced. Further, the reduction in length of the wiring 104 can reduce cost and radiated noise.

Figure 2A:
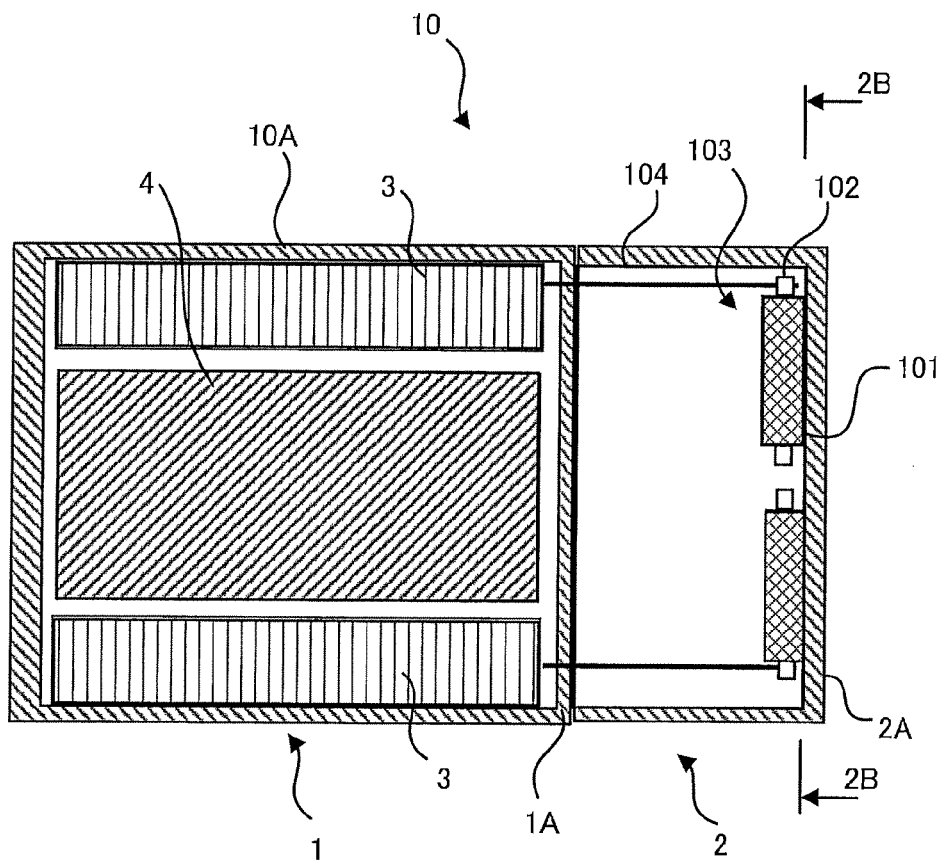
FIG. 2A is a horizontal sectional view of an inverter-integrated motor according to another example of the embodiment of this invention.
Figure 2B:
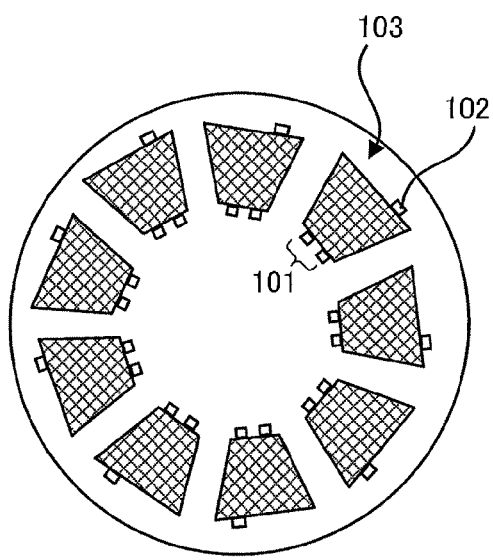
FIG. 2B is a sectional view taken along the line 2B-2B of FIG. 2A.

It should be noted that FIG. 1A and FIG. 1B show an example in which the inverter module 2 is formed on the motor wall 1A, but the inverter module 2 may be formed on an inverter wall 2A that is opposed to the motor wall 1A as illustrated in FIG. 2A and FIG. 2B. FIG. 2A and FIG. 2B are views corresponding to FIG. 1A and FIG. 1B, respectively.

In this case, the wiring 104 becomes longer than that in FIG. 1A and FIG. 1B, but the effects of the reduction in space for the routing of the wiring 104 and space for the connection work, the reduction in cost, and the reduction in radiated noise can be similarly obtained.

As described above, according to the configuration of FIG. 1A and FIG. 1B or FIG. 2A and FIG. 2B, the space for the routing of the wiring 104 for electrically connecting the motor 1 and the inverter module 2 to each other and the space for the connection work can be reduced, and as a result, the inverter module 2 can be downsized while a deterioration in electrical characteristics of the inverter module 2 is suppressed.

Next, a switching element and a current reflux element to be mounted in the power module 103 are described. A description is herein given using an insulated gate bipolar transistor (IGBT) 301 as an example of the switching element and a diode 302 as an example of the current reflux element.

Figure 3:
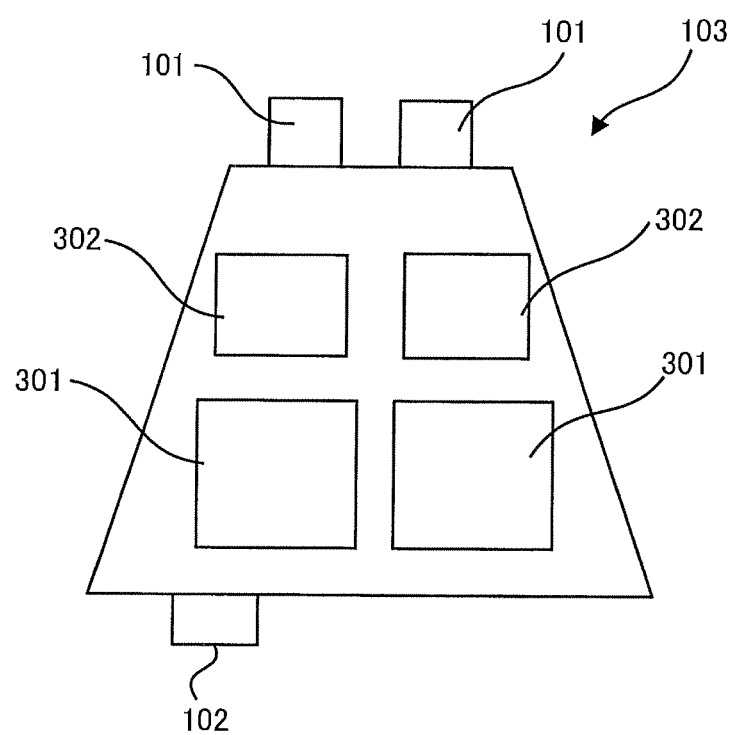
FIG. 3 is a view illustrating an example of arrangement of switching elements and current reflux elements in a power module.

FIG. 3 is a view illustrating an example of the arrangement of the IGBTs 301 and the diodes 302. Two IGBTs 301 are arranged closer to the long side of the power module 103, and two diodes 302 are arranged closer to the short side of the power module 103.

In general, the IGBT 301 tends to have a larger footprint when mounted and a larger heat generation amount than those of the diode 302. Accordingly, the IGBTs 301 are arranged closer to the long side in order to obtain a heat dissipation area for the IGBTs 301 whose heat generation amount is large. Consequently, an average temperature of the IGBTs 301 during the drive of the inverter can be reduced, and as a result, long-term reliability of the inverter module 2 can be improved.

Further, the IGBTs 301 whose mounting footprint is large are arranged closer to the long side, and the diodes 302 whose mounting footprint is small are arranged closer to the short side, and hence it is unnecessary to increase the short side and the long side in order only to mount the respective elements, and upsizing of the power module 103 can be avoided.

Next, the arrangement of control signal input/output terminals 401 of the power module 103 and gate pads 402 serving as control signal input pads of the IGBTs 301 is described.

Figure 4:
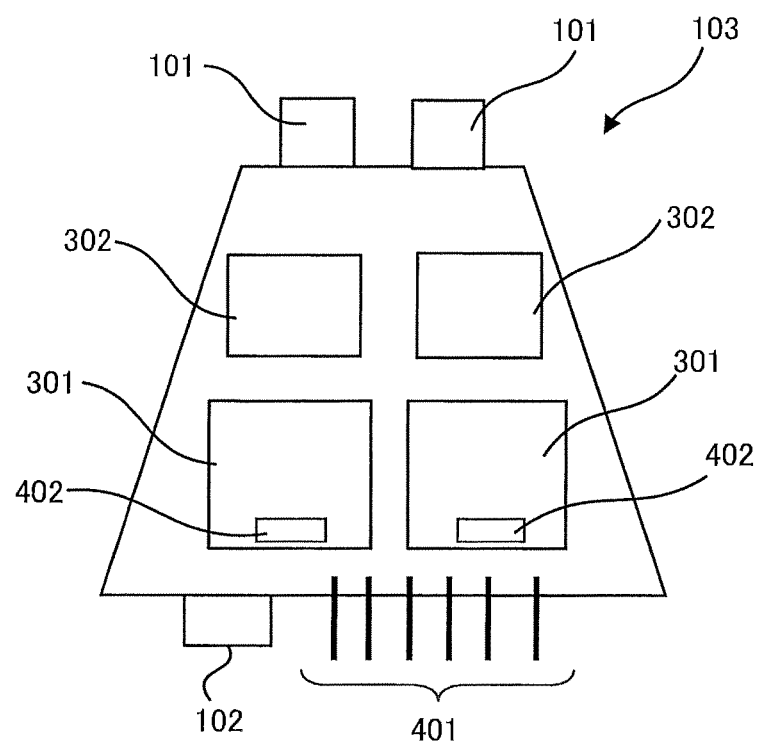
FIG. 4 is a view illustrating an example of arrangement of control signal input/output terminals and control signal input pads.

FIG. 4 is a view illustrating an example of the arrangement of the control signal input/output terminals 401 and the gate pads 402. In this case, the gate pad 402 of the IGBT 301 is arranged in proximity to any one of the four sides thereof.

In an inverter configured to perform switching operation, noise due to an abrupt change in voltage and current is generated in principle. In order to suppress a malfunction of the inverter itself due to the noise, it is necessary to design an IGBT gate drive circuit to have low impedance. In particular, reducing parasitic inductance of wiring of the gate drive circuit is a primary design factor for achieving low impedance.

Then, as illustrated in FIG. 4, the control signal input/output terminals 401 are arranged closer to the long side of the power module 103, and the IGBT 301 is mounted so that the gate pad 402 is located closer to the long side.

Accordingly, the IGBT 301 is mounted in the state in which the gate pad 402 of the IGBT 301 is located in proximity to the control signal input/output terminals 401, and the parasitic inductance of the wiring of the gate drive circuit can be reduced to decrease the impedance generated in wiring between the gate pad 402 and the control signal input/output terminals 401. Further, it is unnecessary to newly provide an additional space for arranging the control signal input/output terminals 401, and hence the upsizing of the power module 103 can be suppressed.

Next, the array of the control signal input/output terminals 401 is described.

Figure 5:
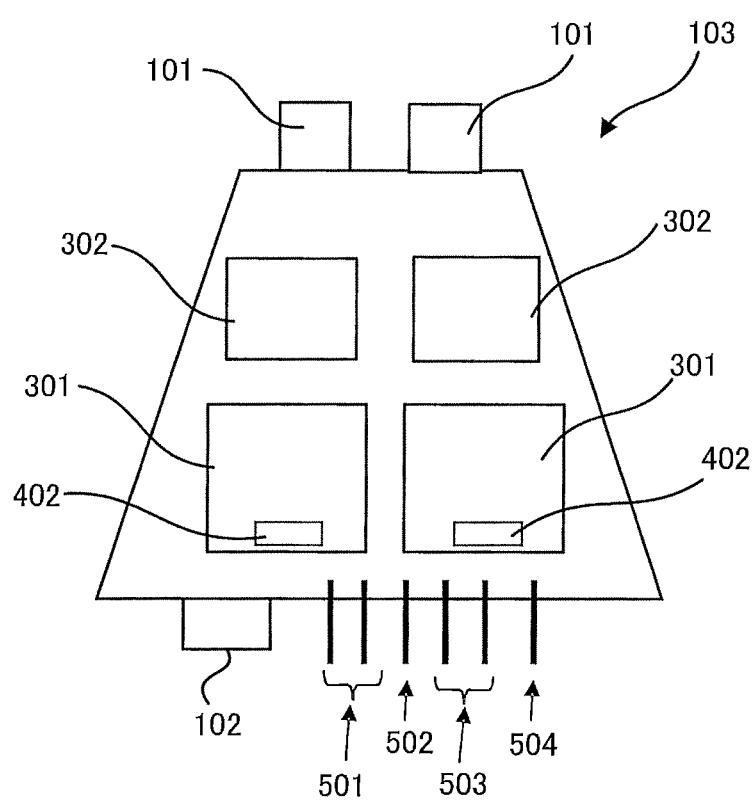
FIG. 5 is a view illustrating an example of array of the control signal input/output terminals.

FIG. 5 is a view illustrating an example of the array of the control signal input/output terminals 401. The control signal input/output terminals 401 include six terminals as illustrated in FIG. 5. In the order starting from the terminal closest to the motor connection terminal 102, there are arranged lower arm switching element-use control signal input terminals 501, a lower arm switching element-use high potential-side potential sense terminal 502, upper arm switching element-use control signal input terminals 503, and an upper arm switching element-use high potential-side potential sense terminal 504.

Taking the IGBT 301 as an example, the switching element-use control signal input terminals 501 and 503 are gate and emitter sense terminals. Similarly taking the IGBT 301 as an example, the switching element-use high potential-side potential sense terminals 502 and 504 are emitter sense terminals.

The above-mentioned terminals 501 to 504 have potentials different from one another during the operation of the inverter, and hence an insulation distance corresponding to a potential difference between the terminals needs to be secured between the terminals. By arraying the terminals 501 to 504 as illustrated in FIG. 5, the total sum of the insulation distances between the respective terminals can be further reduced, and as a result, the length required for the terminal array can be further reduced. Consequently, the power module 103 can be downsized to downsize the inverter module 2.

It should be noted that in FIG. 5 the motor connection terminal 102 is arranged closer to the left end of the power module 103, and the terminals 501 to 504 are arranged in the above-mentioned order toward the right end thereof from the motor connection terminal 102. Alternatively, however, the motor connection terminal 102 may be arranged closer to the right end of FIG. 5, and the terminals 501 to 504 may be arranged in the above-mentioned order toward the left end thereof from the motor connection terminal 102. Further, any of the gate and emitter terminals of the lower arm switching element-use control signal input terminals 501 may be arranged on the motor connection terminal 102 side. The same is true for the upper arm switching element-use control signal input terminals 503.

The actions and effects of this embodiment described above are summarized below.

The plurality of trapezoidal power modules 103, each of which has a single-phase inverter circuit mounted thereon and includes the power supply connection terminals 101 arranged on its short side and the motor connection terminal 102 arranged on its long side, are arranged in an annular pattern so that the long side of each of the plurality of trapezoidal power modules 103 faces toward the outer periphery, to thereby construct a polyphase inverter circuit. Accordingly, the motor connection terminals 102 are arranged at the outer periphery of the inverter module 2 in an annular pattern, and the space for the routing of the wiring 104 for electrically connecting the motor 1 and the inverter module 2 to each other and the space for the connection work can be reduced. As a result, the inverter module 2 can be downsized while the deterioration in electrical characteristics of the inverter module 2 is suppressed.

In the power module 103, the IGBT 301 is arranged closer to the long side, and the diode 302 is arranged closer to the short side, and hence the heat dissipation area for the IGBT 301 whose heat generation is particularly large can be obtained without increasing the surface area of the power module 103. As a result, the average temperature of the IGBTs 301 during the drive of the inverter can be reduced, and the long-term reliability of the inverter module 2 can be improved.

The control signal input/output terminals 401 are arranged closer to the long side, and the IGBT 301 is mounted so that the gate pad 402 is located in proximity to the long side. Consequently, the parasitic inductance of the wiring of the IGBT gate drive circuit can be reduced while the upsizing of the power module 103 is suppressed. As a result, the low impedance of the IGBT gate drive circuit can be achieved, and the possibility of a malfunction of the inverter due to noise can be reduced to improve operational reliability of the inverter module 2.

The motor connection terminal 102 and the control signal input/output terminals 401 are arranged in the order of the motor connection terminal 102, the lower arm switching element-use control signal input terminals 501, the lower arm switching element-use high potential-side potential sense terminal 502, the upper arm switching element-use control signal input terminals 503, and the upper arm switching element-use high potential-side potential sense terminal 504. Consequently, the insulation distances required for the respective terminals can be shortened, and hence the power module 301 can be downsized to further downsize the inverter module 2.

Although a description above has been given of the embodiment of this invention, the embodiment above describes only a part of application examples of this invention, and is not intended to limit the technical scope of this invention to the specific configurations of the above-mentioned embodiment.

This application claims priority from Japanese Patent Application No. 2012-51928, filed on Mar. 8, 2012 in the Japan Patent Office, the entire disclosure of which is incorporated herein by reference.

The invention claimed is:

1. An inverter module for use in an inverter-integrated motor,
    the inverter module being arranged at an axial end portion of a motor,
    the inverter module comprising trapezoidal power modules, each of which has a single-phase inverter circuit mounted thereon, and includes an electrical connection terminal for a power supply arranged on a short side thereof and an electrical connection terminal for the motor arranged on a long side thereof,
    wherein a polyphase inverter circuit is constructed by arranging a plurality of the trapezoidal power modules in an annular pattern so that the long side of each of the plurality of the trapezoidal power modules faces toward an outer periphery,
    wherein each of the trapezoidal power modules comprises:
        control signal input/output terminals arranged on the long side; and
        a switching element mounted closer to the long side in a direction in which a control signal input pad is located in proximity to the long side, and a current reflux element mounted closer to the short side, the current reflux element being electrically connected in parallel to the switching element, and
    wherein the electrical connection terminal for the motor and the control signal input/output terminals are arranged in successive order of the electrical connection terminal for the motor, a lower arm switching element-use control signal input terminal, a lower arm switching element-use high potential-side potential sense terminal, and an upper arm switching element-use control signal input terminal.

2. The inverter module of claim 1, wherein the switching element comprises an insulated gate bipolar transistor.

3. The inverter module of claim 1, wherein the current reflux element comprises a diode.

4. The inverter module of claim 1, wherein the control signal input pad is a gate pad.

5. The inverter module of claim 1, wherein
    the switching element comprises an insulated gate bipolar transistor, and
    the current reflux element comprises a diode.

6. The inverter module of claim 1, wherein
    the switching element comprises an insulated gate bipolar transistor,
    the current reflux element comprises a diode, and
    the control signal input pad is a gate pad.

7. The inverter module of claim 1,
    wherein the control signal input/output terminals further comprise an upper arm switching element-use high potential-side potential sense terminal, and
    wherein the electrical connection terminal for the motor and the control signal input/output terminals are arranged in successive order of the electrical connection terminal for the motor, the lower arm switching element-use control signal input terminal, the lower arm switching element-use high potential-side potential sense terminal, the upper arm switching element-use control signal input terminal, and the upper arm switching element-use high potential-side potential sense terminal.

* * * * *